Nov. 22, 1966  K. HELBER  3,286,614
PHOTOGRAPHIC AUTOMATICALLY COCKED SHUTTER WITH ESCAPEMENT
MECHANISMS FOR OBTAINING BOTH SHORT AND
ULTRA-LONG EXPOSURE TIMES
Filed Sept. 29, 1964  4 Sheets-Sheet 2

INVENTOR.
Karl Helber
BY
Arthur A. March
ATTORNEY

United States Patent Office 3,286,614
Patented Nov. 22, 1966

3,286,614
PHOTOGRAPHIC AUTOMATICALLY COCKED SHUTTER WITH ESCAPEMENT MECHANISMS FOR OBTAINING BOTH SHORT AND ULTRA-LONG EXPOSURE TIMES
Karl Helber, Calmbach (Enz), Germany, assignor to Alfred Gauthier G.m.b.H., Calmbach (Enz), Germany, a corporation of Germany
Filed Sept. 29, 1964, Ser. No. 400,095
Claims priority, application Germany, Oct. 5, 1963, G 38,863
7 Claims. (Cl. 95—63)

The present invention relates to a photographic self-cocking shutter having one escapement mechanism associated with the shutter blade drive for shorter, controlled exposure times and another escapement mechanism provided with a driving spring for obtaining ultra-long exposure times.

In shutters of this type known heretofore, it has been found to be a disadvantage that an additional manipulation was required for cocking the driving spring of the long-exposure time escapement mechanism. It was too easy for the photographer to fail to cock the long-exposure time escapement mechanism which, of course, caused faulty exposures.

It is the object of the present invention to provide an improved shutter mechanism requiring no additional manipulations to set the ultra-long exposure time escapement mechanism.

The present invention includes, in addition to the usual controllable shutter blade drive escapement mechanism for relatively short exposure times, another shutter blade drive that can be cocked simultaneously with the long-exposure time escapement mechanism. A pawl, which may be pushed or slid, is associated with the driving mechanisms to be moved into one of two setting positions by an operating lever, in response to the setting of the exposure time-setting member. The pawl operates, during the cocking process, either on the shutter blade drive for short exposure times or on the shutter blade drive for ultra-long exposure times. Therefore, no additional manipulations are required for switching on or cocking the long-exposure time escapement mechanism. In order to make ready for an exposure, regardless of whether it is to be a short exposure or an ultra-long one, the photographer merely has to set the desired exposure time and subsequently to cock or release the shutter. The photographer need not make the additional manipulations previously required for cocking a second escapement mechanism to make extra-long exposures.

According to another feature of the invention, the shutter blade drive associated with the long-exposure time escapement mechanism may comprise a cocking lever cooperating with the pawl, a driving spring, and a driving lever which acts on the bearing ring of the shutter blades and which is kept in cocked position by an arresting lever. This arrangement of an additional drive for the shutter blades is especially simple and is quite trouble-free.

For dependable operation of the shutter, it is preferable to provide a locking device which is actuated when the exposure time-setting member is set at ultra-long exposure times. The locking device cooperates with the bearing ring and blocks the shutter blade drive associated with the long-exposure time escapement mechanism in the position corresponding to the open position of the shutter blades.

A preferred form of the locking device is a two-armed lever rotatably mounted on a fixedly positioned lever that cooperates with a control cam of the exposure time-setting member. By means of the fixedly positioned lever, the arresting lever can be set at different relative positions with respect to an actuating device of the long-exposure time escapement mechanism. The actuating device is designed to release the arresting lever.

In order to make certain that when the shutter is set to make ultra-long exposures, the release of the driving mechanism associated with the long-exposure time escapement mechanism for the shutter blades takes place before the cocked long-exposure time escapement mechanism starts to run down; the invention also includes a locking device which acts on some part of the long-exposure time escapement mechanism, for example, on the escapement anchor, and which can be released by the bearing ring of the shutter blades at the beginning of its opening motion.

Details of the invention will become apparent from the specification that follows and from the accompanying drawing which illustrates an embodiment of the invention and in which.

Figure 1:
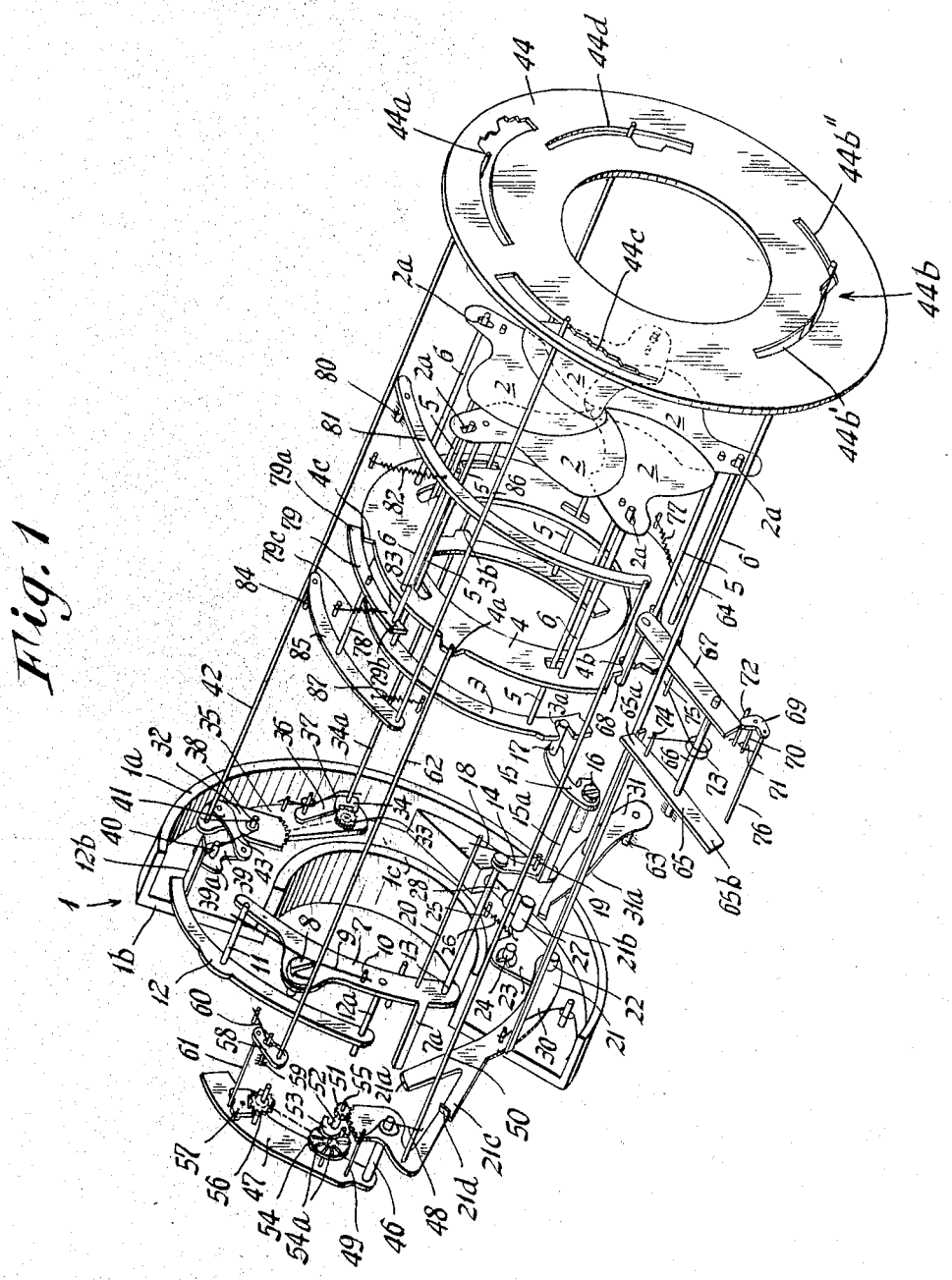
FIG. 1 is a perspective, exploded view of a self-cocking shutter having one escapement mechanism for relatively short exposure times and another escapement mechanism for longer exposures.

The drawings show a photographic shutter housing 1 comprising a cylindrical side wall 1a and a bottom 1b. The bottom 1b is provided with a tubular opening or socket 1c which is arranged concentrically with the side wall 1a to receive the lens assembly. Two rings 3 and 4 are rotatably mounted on the socket 1c for driving and positioning a plurality of shutter blades 2. The shutter blades 2 are rotatably positioned on pins, or pivots, 5 on the ring 3, and each blade has a slot 2a that engages one of the pins 6 fixed on the bearing ring 4. A two-armed lever 7 for driving the shutter blades 2 is rotatably positioned on a bearing pin 8 extending from the bottom 1b of the shutter housing 1. A driving spring 9, which is slipped over the bearing pin 8 to bias the lever 7 counter-clockwise, abuts with one end against a pin 10 of the driving lever 7 and with the other end against a pin 11 on a lever 12, which is articulately connected to the driving lever 7 by means of a pin, or pivot, 12a.

At one end of the driving lever 7 is a pin, or pivot, 13 on which a driving pawl 14 is rotatably mounted to serve as the means for transmitting kinetic forces of motion to the shutter blade ring 3 and for reversing motion of the latter. At its free end, the driving pawl 14 has the usual coupling jaw 14a which engages a lug 15a bent off from an intermediate lever 15. The latter is pivotally mounted on a pin 16 at the bottom 1b of the housing and has, at its free end, a pin 17 that engages a slot 3a in the shutter blade ring 3. A spring 18 keeps the driving pawl 14 in engagement with the lug 15a during the running down of the exposure. One end of this spring engages a pin 19, while the other end engages a pin 20 on the driving lever 7.

A pawl 21, which may be pushed or slid, cooperates with the driving lever 7 and is designed to cock the driving spring 9. This pawl is articulately connected to a reversing lever 23 by means of a pin 22, as is especially apparent in FIGS. 2 to 4. The reversing lever 23 is mounted on a pin, or pivot, 24 affixed to the bottom 1b of the housing and is biased counterclockwise by a tension spring 26 which is stretched between the lever 23 and a fixed pin 25. The spring 26 pulls the lever 23 so that a pin 27 on the lever engages the release pusher 28 of the shutter. The release pusher, or trigger 28 slides within a tube 29 that extends through the side wall 1a of the shutter housing. The outer end of the tube may be provided with the conventional internal thread for receiving a cable release.

The pawl 21 is biased by means of a spring 30 against the control edge 31a of an operating lever 31. The free end of the pawl is forked and one of the forks is an arm 21a that cooperates with a lug 7a bent off from the driving lever 7 in such a way that it produces a clockwise rotary motion of the driving lever during the cocking process of the driving spring 9. When the lever 7 and pawl 21 have moved to a certain position, the arm 21a moves away from the lug 7a under pressure from the control edge 31a. As a result, the driving lever 7 is returned to the starting position by the pressure of the spring 9. In doing so, it imparts a reciprocating motion to the shutter blade ring 3 by way of the pawl 14 and the intermediate lever 15, causing the shutter blades 2 to be opened and closed again.

The lever 12 articulately connected to the driving lever 7 actuates a gear escapement mechanism within the housing 1. This escapement mechanism delays, to a greater or lesser degree, the running down of the driving lever 7 after the shutter blades have reached their open position. In this way the duration of the exposure is controlled. The gear escapement mechanism may be of known type and may include a toothed segment 32 connected to a set of gears to drive them, which set comprises an escapement or ratchet wheel 33 and an escapement anchor 34. Other gears in the set are indicated in the conventional manner by a dot-and-dash line and the gears are mounted between two plates, of which only the lower plate 35 is shown in FIG. 1 for the sake of clarity. In order to facilitate setting the escapement mechanism at the desired exposure time, the escapement anchor 34 is held out of engagement with the escapement wheel 33 when the shutter is in its rest position. This is accomplished by providing a lever 36 pivotally mounted on the gear plate 35 and on which the escapement anchor 34 is mounted. The bearing pin 34a of the escapement anchor is pressed against the outer edge of the shuter blade ring 3 by a relatively weak spring 37. This edge includes a raised section 3b which lifts the escapement anchor 34 off the escapement wheel 33 when the shutter is in a rest, or neutral, position as shown in FIG. 1.

The segment gear 32 is mounted on a pin 38 extending from the gear plate 35 and is connected to a breaking lever 39 pivotally mounted on a pin 40 extending from the bottom 1b of the shutter housing. The braking lever 39 and the segment gear 32 are connected by a coupling 41 articulately connected at one end to the segment 32 and at the other end to the braking lever 39. A coil spring 43 presses against a pin 42 on the segment 32 to urge the escapement mechanism together with the braking lever 39 in the starting position corresponding to the longest controlled exposure time. Because of the force of the spring 43, the pin 42 presses against a cam edge 44a on the shutter speed control, or exposure time setting member 44. The purpose of the shutter speed control 44 is to set the escapement mechanism 32–43 at the desired exposure duration. The cam 44a imparts to the projection 39a of the braking lever 39 a specific relative position, dependent upon the exposure time that has been selected, with respect to the lug 12b of the lever 12. As a result, during the running down of the driving lever 7 the lug 12b remains engaged with the stud 39a for a predetermined distance when the shutter blades 2 have reached their open position.

In addition to the foregoing gear escapement mechanism for obtaining different exposure times of the order of magnitude of 1 second to 1/500 second, a second gear escapement mechanism is located in the shutter housing 1 to control the shutter blades 2 for making much longer exposures but still of controlled duration, the latter exposures being referred to as ultra-long exposures.

The second escapement mechanism includes a toothed segment 45 rotatably mounted on a pin 46 which, in turn, is mounted on a gear plate 47. A coil spring 48 biases the segment 45 counterclockwise by pressure developed between a pin 49 on the gear plate 47 and a pin 50 on the segment 45. A pinion 51 is non-rotatably mounted on a hollow shaft 52 to mesh with the segment 45. At the free end of the shaft 52 is a two-bladed stop, or detent, spring 53 that cooperates with detent openings 54a of a gear 54, as shown in FIG. 1. The gear 54 has a shaft 55 seated in the gear plate 47 and on which the hollow shaft 52 is supported. The stop spring 53 is shaped so that it slides over the detent openings 54a without engaging them during the cocking motion of the segment 45, whereas the spring 53 engages the openings 54a during the running down of the segment 45, thus transmitting the rotary motion of the pinion 51 to the gear 54 and to the other gears that mesh therewith. FIG. 1 shows only one escapement wheel 56 and one escapement anchor 57 cooperating therewith; the remaining members of the gear mechanism are symbolically indicated by a dot-and-dash line.

The arrangement of such a driver, which is operative during the running down motion of the mechanism, is necessary because the mechanism is associated with a locking device which is in its operative position when the mechanism is in its rest position. The purpose of the locking device is to arrest the running mechanism in cocked position after the driving spring 48 has been cocked. This locking device is a two-armed lever 58 mounted on the bottom 1b of the shutter housing on a pivot pin 59. The lever 58 is biased counterclockwise by a spring 60. The arresting lever 58 has a pin at each end. One of these pins 61 extends in one direction from the lever 58 and engages the escapement anchor 57, while the other pin 62 extends in the opposite direction and is pressed against a cam 4a on the bearing ring 4 by a spring 60. In the starting position of the bearing ring 4, as illustrated in FIG. 1, the engagement of the pin 62 with the cam 4a pivots the lever 58 so that the pin 61 blocks any movement of the escapement anchor 57. If the ring 4 is rotated clockwise to open the shutter blades 2, the cam 4a moves away from the pin 62 which permits the lever 58 to be pivoted counterclockwise by the spring 60 to allow the pin 61 to release the anchor 57. This allows the long-exposure time escapement mechanism to run down.

As may be seen in the drawings, the long-exposure time escapement mechanism 45–57 can be cocked by means of the pawl 21, which is also used in cocking the driving lever 7 cooperating with the escapement mechanism 32–43.

In accordance with the invention whereby either short or long-controlled exposures may be made, the cocking motion of the pawl 21 can be imparted either to the driving lever 7 or to the gear segment 45. This is carried out by the switching lever 31, the control edge 31a of which is engaged by an arm 21b bent from the pawl 21 and forced against the control edge 31a by the spring 30. The lever 31 is mounted on a fixed bearing pin 63 and has another pin 64 extending from it into a control slot 44b of the shutter speed control 44.

Figure 3:
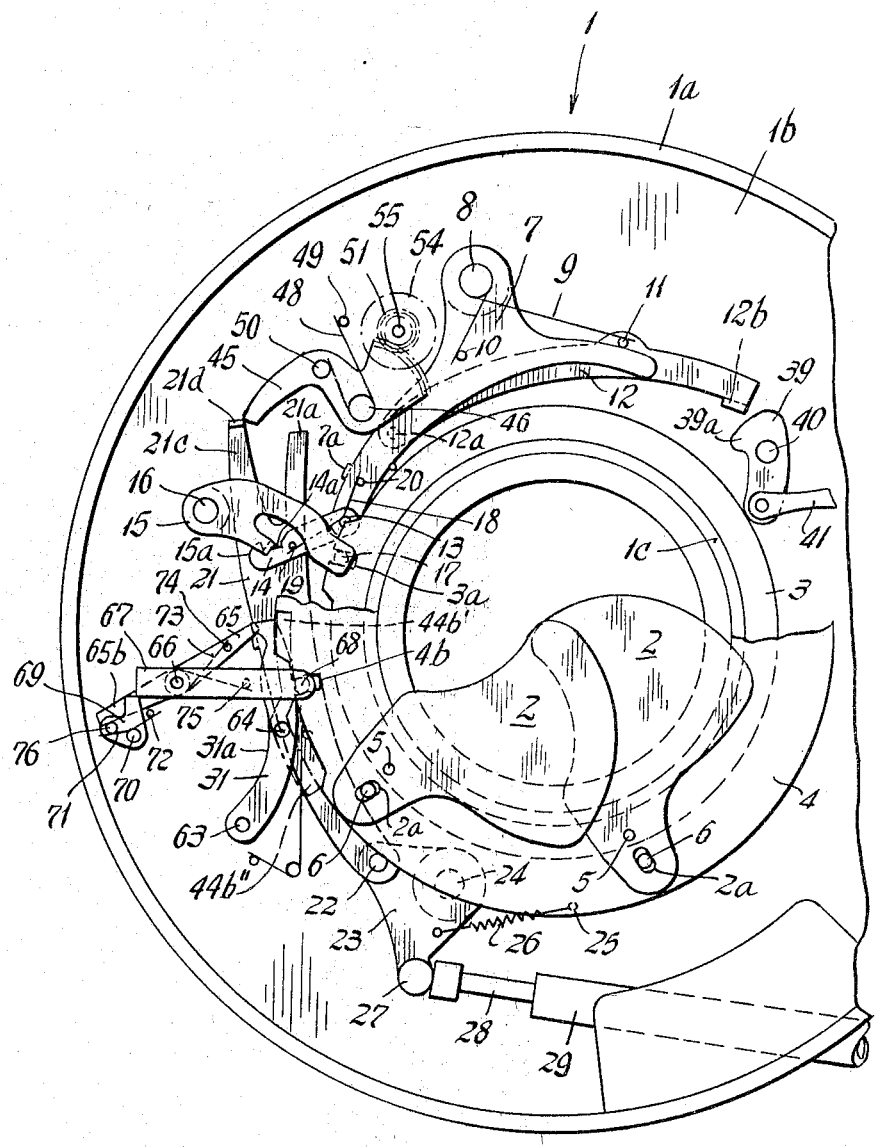
FIG. 3 shows the shutter mechanism of FIG. 1 shortly before the cocking process is completed.
Figure 4:
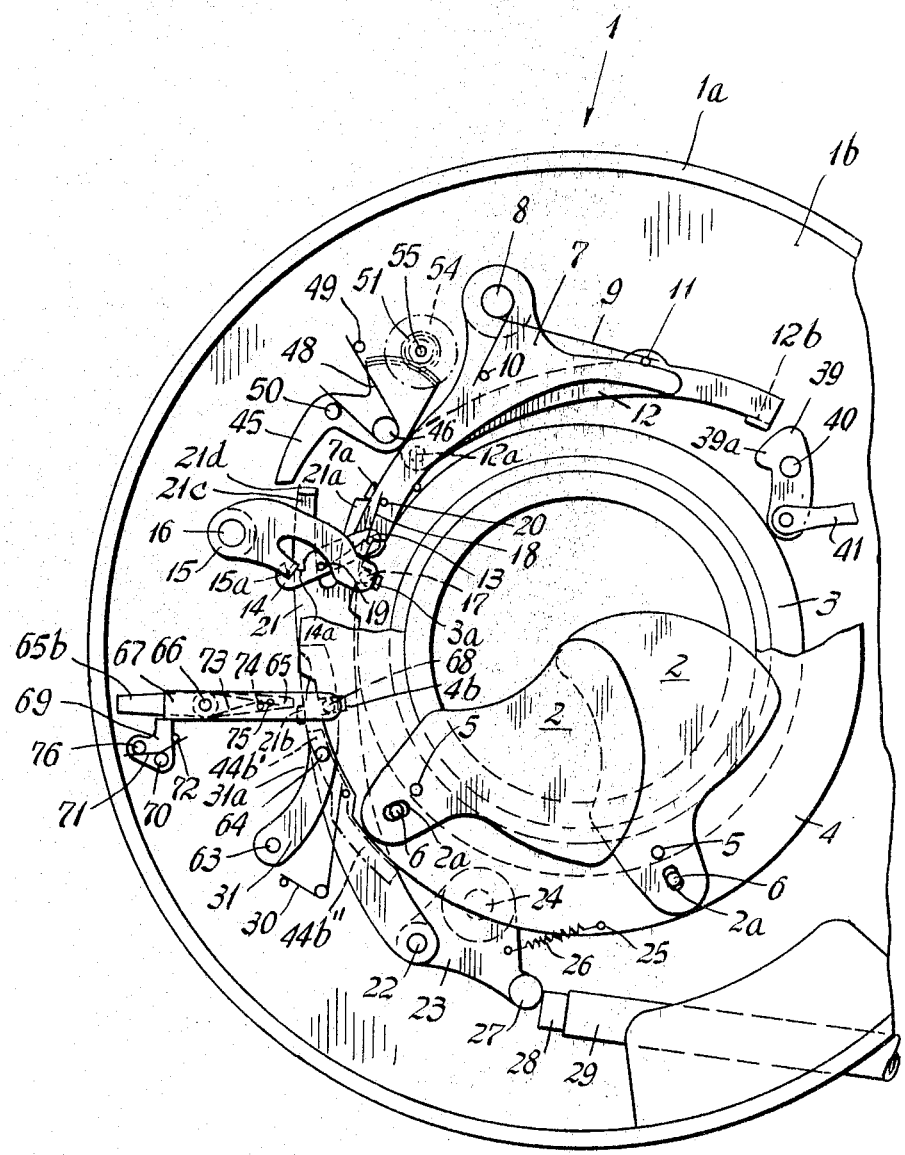
FIG. 4 shows the shutter in FIGS. 2 and 3 in a setting position in which the pawl is connected to the normal shutter blade drive which cooperates with the escapement mechanism for instantaneous exposure times.

The slot 44b may be shaped so that, when the shutter is set for short exposures, the pin 64 is in contact with section 44b' of the slot 44b. This causes the operating lever 31 to occupy a position such that, during the cocking process, the pawl 21 impinges on the lug 7a, while the long-exposure time mechanism is not affected by the pawl 21. However, if the shutter speed control 44 is set for ultra-long exposures, which is the position shown in FIG. 1, the pin 64 is in contact with section 44b'' of the slot 44b. This causes the operating lever 31 to move so that, during the cocking process, the pawl 21 no longer engages the lug 7a, but instead engages the gear segment 45 of the long-exposure time escapement mechanism, thereby moving it into cocked position, as shown in FIG. 3, and simultaneously cocking the driving spring 48. In order to cooperate with the gear segment 45, the pawl 21 has an arm 21c with a lug 21d bent-off therefrom to impinge on the free end of the gear segment 45 during the cocking process. As has been described hereinabove, the long-exposure time escapement mechanism 45–57 is held in its cocked position by the arresting lever 58, which is controlled by the bearing ring 4 and which has a pin 61 that bears against the escapement anchor 57.

In order to control the shutter blades 2 when setting the shutter for ultra-long exposures, the present invention provides, in addition to the shutter blade driving mechanism including components 3, and 7 to 20, a second shutter blade driving mechanism which is cocked at the same time as the long-exposure time escapement mechanism 45–57. This second shutter blade driving mechanism comprises a two-armed cocking lever 65 rotatably, movably mounted on a fixed shaft 66. Another driving lever 67 is mounted on the same shaft and carries a pin 68 that engages a slotted guide 4b of the bearing ring 4. In addition, an arresting lever 69 is associated with the lever 67 to block the latter in the position corresponding to the starting position of the bearing ring 4. The lever 69 is pivotally mounted on a pin 70 at the bottom 1b of the shutter housing. One end of a spring 71 is hooked over a fixed pin 62 while the other end presses against the pin 71 to rotate the lever 69 clockwise. A driving spring 73 is also mounted on the shaft 66 and one end of this driving spring engages a pin 74 of the cocking lever 65, while the other end presses against a pin 75 on the lever 67 to urge the lever counterclockwise.

The driving spring 73 is cocked by means of the bent-off arm 21b which engages the arm 65a of the cocking lever 65 from below and thus rotates the cocking lever counterclockwise around the shaft 66. At the end of the cocking process, the arm 65b of the lever 65 engages a pin 76 of the arresting lever 69, rotating the latter against the force of the spring 71 and thus releasing the driving lever 67. The driving spring 73 is then able to rotate the driving lever 67 counterclockwise, which causes the pin 68 to rotate the bearing ring 4 clockwise by a relatively small amount. This rotation is enough to move the shutter blades 2 to their open position. A closing spring 67 hooked on the bearing ring 4 is stretched so that it can return the ring, along with the shutter blades 2, to the starting position.

The bearing ring 4 can be blocked in a position corresponding to the open position of the shutter blades 2 by means of a locking device that can be released by the long-exposure time escapement mechanism 45–57. This blocking is accomplished by a two-arm arresting lever 79 pivotally mounted on a pin 78 and biased clockwise by a spring 79c. This causes the arm 79a of the arresting lever to catch behind a projection 4c extending from the bearing ring 4, as soon as this ring reaches the position corresponding to the open position of the shutter blades 2 after the driving lever 67 has been released.

The release of the ring 4 is brought about by an actuating device controlled by the long-exposure time escapement mechanism 45–57. This actuating device includes an actuating lever 81 which is positioned on a fixed pivot pin 80 and which is biased by a coil spring 82 that pulls the lever into contact with the pin 50 of the long-exposure time escapement mechanism. During the running down of the latter, the lever 81 is pivoted counterclockwise by the pin 50 so that it finally impinges upon a pin 83 affixed to the arm 79b of the arresting lever 79. This causes the arresting lever to rotate counterclockwise and thus to remove the lever from engagement with the projecting edge 4c of the bearing ring 4. This releases the bearing ring 4, and the closing spring 44 is then able to return it to its starting position, thereby closing the shutter blades 2.

In order to control the duration of ultra-long exposures, the pin 83 can be set, by means of the shutter speed control 44, at different relative positions with respect to the actuating lever 81. For this purpose, the bearing pin 78 of the arresting lever 79 is mounted on an additional lever 85. The lever 85 has a fixed bearing pin 84 and another pin 86 which is urged by the force of a spring 87 against a cam 44c on the shutter speed control 44. The cam 44c makes it possible to change the setting position of the lever 85 and thereby the relative position of the arresting lever 79 and of its pin 83 with respect to the actuating lever 81. This change in the relative position of the pin 83 causes the actuating lever 81 to impinge thereon, either earlier or later, as the long-exposure time escapement mechanism 45–57 runs down. As a result, the release of the bearing ring 4 for closing the shutter blades 2 comes after a longer or shorter path has been traversed by the long-exposure time escapement mechanism.

The operation of the self-cocking shutter of this invention will be described with reference to all of the drawings.

If an ultra-long exposure is to be made, the desired exposure time must first be set by means of the shutter speed control 44. The cam 44c, which is operative in the ultra-long exposure range, causes the pin 83 to be moved to a specific relative position with respect to the actuating lever 81. In addition, section 44b'' of the slot 44b causes the operating lever 31 to occupy the position shown in FIG. 1 with the result that, during the subsequent cocking process, the cam 21 presses against the gear segment 45 of the long-exposure time escapement mechanism 45–57.

During the cocking motion, the pawl 21 is rotated by the control erge 31a, which finally releases the gear segment 45, as illustrated in FIG. 3. Immediately thereafter, i.e., almost simultaneously with the release of the long-exposure time escapement mechanism, the cocking lever 65 strikes the pin 76 and thereby unlocks the driving lever 67.

Due to the action of the driving spring 73, the driving lever 67 rotates counterclockwise, causing the shutter blades 2 to open as the ring 4 is rotated clockwise. The cam 4a slides away from beneath the pin 62, thereby releasing the long-exposure time escapement mechanism for running down. When the shutter blades 2 are in their open position, the lever 79 moves in front of the projection 4c and, for a time, prevents the bearing ring 4 from rotating counterclockwise. The gear segment 45 rotates during the running down of the long-exposure time escapement mechanism and its pin 50 finally presses against the actuating lever 81 at a time determined by the preset shutter speed. The lever 81 pushes the pin 83 and rotates the lever 79 counterclockwise to release the ring 4, whereupon the closing spring 77 rotates the ring 4 counterclockwise and closes the shutter blades 2.

Relatively short exposures are made by setting the shutter speed control 44 to a desired exposure time, or shutter speed, which, in the embodiment shown, means that the shutter speed control must be rotated counterclockwise. This causes the pin 42 connected to the short-exposure time escapement mechanism 32–43 to engage the step-shaped portion of the cam 44a. Simultaneously, the pin 64 is brought into contact with section 44b' of the slot 44b. This causes the lever 31, to which the pin 64 is attached, to pivot clockwise through a small angle and the pawl 21 follows this motion because of the pressure of its spring 30. The pawl 21 is thus brought into position indicated in FIG. 4, in which its arm 21a engages the lug 7b of the driving lever 7 from below. At the same time, the arm 21c is no longer in contact with the gear segment 45 of the long-exposure time escapement mechanism and the arm 21b is no longer able to control the cocking lever 65.

If the pawl 21 is now actuated, its arm 21a pushes the lug 7a ahead of it, whereby energy is stored in the driving spring 9. The driving pawl 14 also takes part in this motion of the driving lever 7 but without moving the intermediate lever 15 and, therefore, without moving the shutter blade ring 3 out of the starting position shown in FIG. 1. This is due to the fact that during the first phase of motion of the driving lever 7, the pawl 14 moves along the underside of the lug 15a without engaging it. Instead, the pawl 14 engages the lug 15a in its jaw 14a only at the end of the cocking motion and by virtue of the pressure of the spring 18. During this cocking motion of the driving lever 7, the lever 12, which cooperates with the arresting lever 39 of the short-exposure time escapement mechanism 32–43, moves so that its lug 12b slides along the projection 39a whereby the pin 11 designed to engage the driving spring 9 is left off the driving lever 7. After the lug 12b has become caught beyond the projection 39a, the pin 11 again engages the driving lever 7.

At the end of the cocking motion, a relative movement is imparted to the pawl 21 by the control edge 31a of the lever 31 to release the driving lever 7 by the arm 21a. The pressure of the driving spring 9 forces the driving lever 7 into its second phase of motion and opens the shutter blades 2 through operation of the driving pawl 14 and intermediate lever 15. When the shutter blades are near the end of their opening motion, the lever 12 strikes the braking lever 39 of the escapement mechanism 32–43 and, after traveling a distance that depends upon the presetting of the escapement mechanism, again slides off the braking lever. The driving lever 7 continues its pivoting motion under the pressure of the spring 9 and finally returns to the rest position illustrated in the drawing. During this process the driving pawl 14 rotates the intermediate lever 15 counterclockwise under the control of the driving lever 7 and this counterclockwise rotation of the intermediate lever 15 causes the shutter blades 2 to return from their open position to their closed position.

Figure 2:
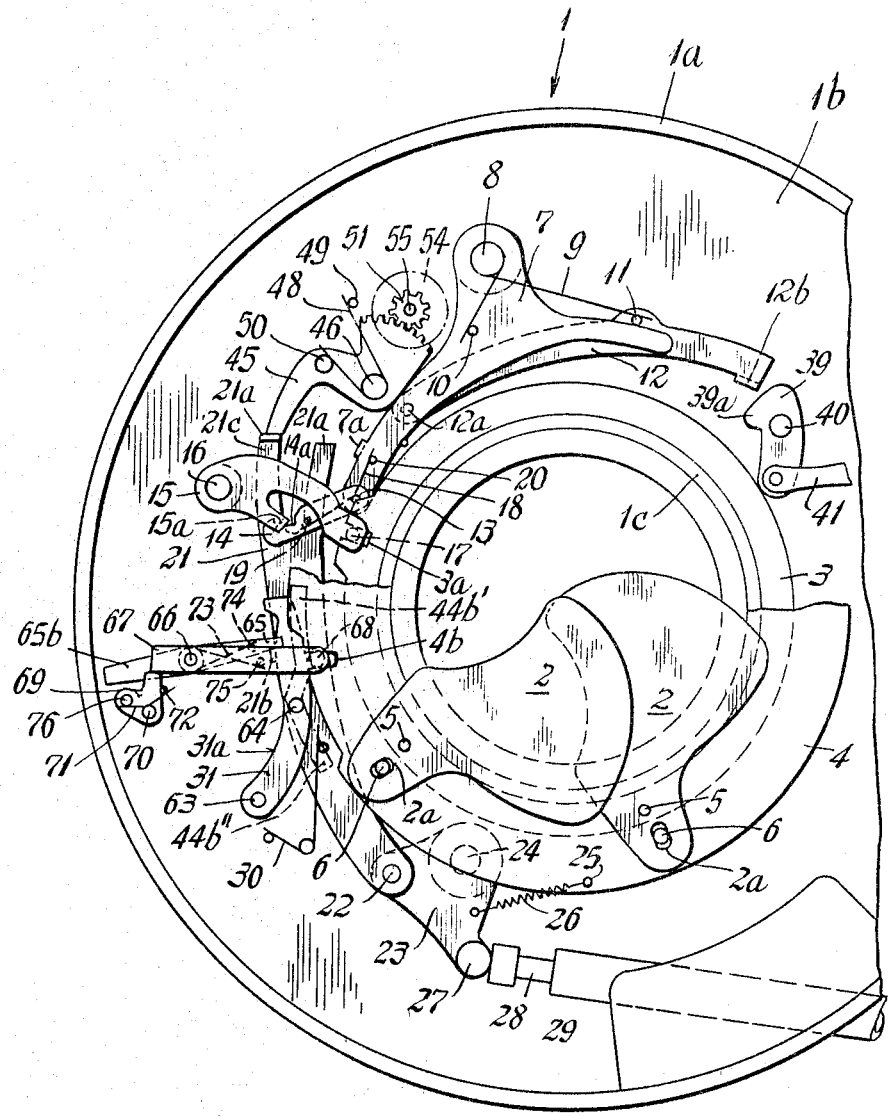
FIG. 2 is a front view of part of the shutter mechanism of FIG. 1 during the cocking process.

As is apparent from FIG. 2, the escapement mechanism 32–43 operates in the short-exposure time range party with and partly without an anchor escapement. For this purpose, the bearing pin 34a of the escapement anchor 34 engages the cam 44d of the shutter speed control 44. Cam 44d is shaped so as to release the escapement anchor 34 and permit it to become operative in a specific section of the setting range for short exposures only.

What is claimed is:

1. A photographic self-cocking shutter comprising: a shutter blade; means to control the movement of said shutter blade between an open position and a closed position; a first driving mechanism connected to said means and comprising a first driving spring; a first escapement mechanism associated with said driving mechanism to control the operation thereof for making relatively short exposures of controlled duration; a second driving mechanism connected to said means and comprising a second driving spring; a second escapement mechanism associated with said second driving mechanism and connected to make relatively long exposures of controlled duration; a pawl; and a shutter speed control to set the position of said pawl to place it in operative engagement with either said first or said second driving mechanism, said pawl being connected to cock said first driving spring when said pawl operatively engages said first driving mechanism, said pawl being connected to cock said second driving spring and said second escapement mechanism simultaneously.

2. A photographic, self-cocking shutter according to claim 1 in which said second driving mechanism comprises: a cocking lever connecting said second driving spring to said pawl; a driving lever connecting said second driving spring to said means; and an arresting lever operatively connected to said driving lever to hold said driving lever in cocked position.

3. A photographic, self-cocking shutter according to claim 2 comprising, in addition: a locking device connected to said shutter speed control to be operated thereby to hold said shutter blade in the open position when said shutter speed control is set to place said pawl in operative engagement with said second escapement mechanism.

4. The photographic, self-cocking shutter of claim 3 in which said locking device operatively engages said second driving mechanism to lock the latter in its position corresponding to the open position of said shutter blade.

5. The photographic, self-cocking shutter of claim 3 in which said locking device comprises a two-armed lever, said shutter comprising, in addition, a second lever connected to said shutter speed control to be operated thereby, said two-armed lever being pivotally mounted on said second lever to have its position controlled by said second lever; and an actuating device connected to said second escapement mechanism to be controlled thereby and connected to said locking device to release said two-armed lever at a time determined by the setting of said shutter speed control.

6. A photographic, self-cocking shutter comprising: a shutter blade; means to control the movement of said shutter blade between an open position and a closed position; a first driving mechanism connected to said means and comprising a first driving spring; a first escapement mechanism associated with said driving mechanism to control the operation thereof for making relatively short exposures of controlled duration; a second driving mechanism connected to said means and comprising a second driving spring; a second escapement mechanism associated with said second driving mechanism and connected to make relatively long exposures of controlled duration; locking means connected to said second escapement mechanism to prevent the running down thereof while said second escapement mechanism is being cocked, said locking means being connected to said means to control the movement of said shutter blade to be released at the start of the opening motion of said blade; a pawl; and a shutter speed control to set the position of said pawl to place it in operative engagement with either said first or said second driving mechanism, said pawl being connected to cock said driving spring when said pawl operatively engages said first driving mechanism, said pawl being connected to cock said second driving spring and said second escapement mechanism simultaneously.

7. The photographic, self-cocking shutter of claim 6 in which said second escapement mechanism comprises an anchor and said locking means presses against said anchor to prevent said anchor from moving.

References Cited by the Examiner

UNITED STATES PATENTS 2,906,186  9/1959  Gorey _____ 95—63
2,961,935  11/1960  Rentschler _____ 95—63

JOHN M. HORAN, *Primary Examiner.*